March 8, 1955  L. H. GEVANTMAN ET AL  2,703,488
FOG MIST CHAMBER
Filed Feb. 16, 1954
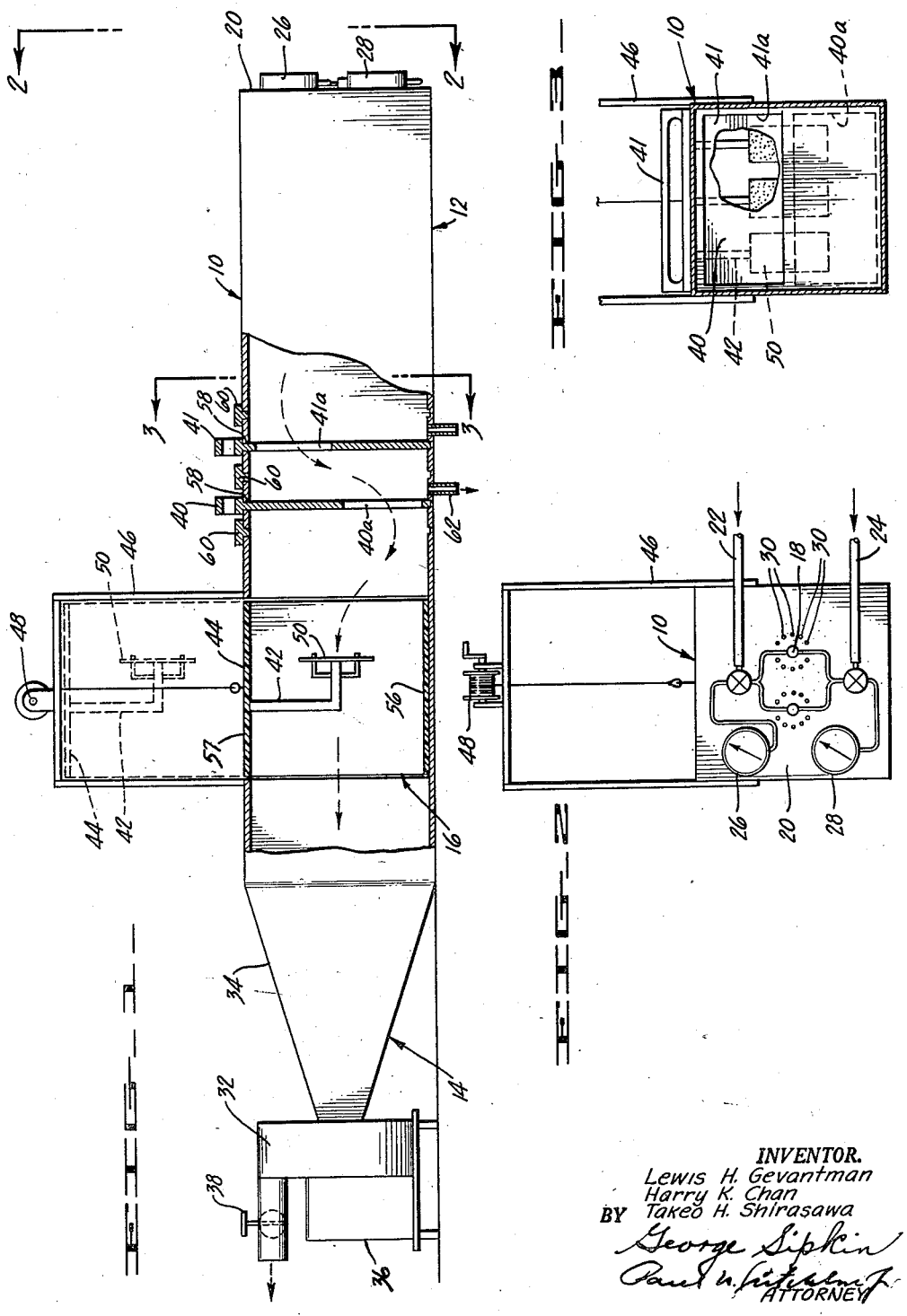
INVENTOR.
Lewis H. Gevantman
Harry K. Chan
BY Takeo H. Shirasawa
ATTORNEY

United States Patent Office 2,703,488
Patented Mar. 8, 1955

2,703,488

FOG MIST CHAMBER

Lewis H. Gevantman, Daly City, and Harry K. Chan and Takeo H. Shirasawa, San Francisco, Calif., assignors to the United States of America as represented by the Secretary of the Navy Application February 16, 1954, Serial No. 410,747

5 Claims. (Cl. 73—53)

(Granted under Title 35, U. S. Code (1952), sec. 266)

This invention may be manufactured and used by or for the Government of the United States of America for governmental purposes without the payment of any royalties thereon or therefor.

This invention relates to apparatus for exposing material samples to aerosols of varying particle size, velocity, etc.

One of the experiments commonly conducted in material testing involves the observation and measurement of the deleterious effects on materials of particular liquid aerosols, and it has been found that these effects can be greatly intensified by the use of such fog or mist aerosols principally because these aerosols are capable of building up greater film thicknesses on the material sample than otherwise would be obtainable in a corresponding time following the conventional dipping process.

Attempts have been made at providing humidification chambers for this purpose but the reliability or effectiveness of these prior chambers has not been satisfactory for many testing purposes principallly because they were constructed to provide a static atmosphere in which it is difficult to regulate particle size, density and velocity of the liquid aerosols. For example, such prior chambers were unsuitable for conducting experiments in which the particle size had to fall between prescribed limits and in which it was desirable to test the effect of varying rates of aerosol velocity. In tests such as are contemplated the particle size, density, velocity, as well as the uniformity of experimental conditions must be closely controlled if usable data is to be obtained.

It is, therefore, a general object of this invention to provide apparatus for exposing a test material to an aerosol medium that has uniformly controlled dynamic flow conditions.

Another object is to provide such exposure apparatus in which the liquid size and density can be adjustably controlled.

Other objects are to provide apparatus whereby the samples to be exposed to the aerosol atmosphere may be removed from the apparatus without effecting flow conditions and to provide an exposure section in the apparatus in which the samples may be observed during exposure.

These and other objects of the invention will become apparent in the detailed description.

In accordance with the invention, apparatus is provided for subjecting samples to a known aerosol medium under uniform dynamic flow conditions, this apparatus, preferably, being formed of an elongate chamber having at one end a fog-mist generator, such as a pneumatic nozzle into which is introduced the liquid to form the desired aerosol. A plurality of air inlet openings may be provided adjacent the nozzle, and the aerosol drawn through the chamber by a fan or other exhaust means mounted at its other end. When a fan is used to create the flow conditions, an adjustable damper may be arranged to control the aerosol velocity through the chamber. The samples, which may be coatings applied to test panels, are mounted on holders positionable in the chamber in the path of the aerosol flow. The holders, preferably, are mounted in an exposure section of the chamber and the arrangement is such that they can be moved without affecting flow conditions. The exposure section may have a window to permit observation of the samples being subjected to the aerosol stream. To improve the flow condition, and to control the size of the aerosol particles, one or more baffles may be arranged between the generating section and the exposure section, and, most suitably, these baffles are interchangeable and adjustable to provide a control over maximum particle size.

The preferred embodiment of the invention is illustrated in the accompanying drawing of which Fig. 1 is a partially-sectioned elevational view of the apparatus; Fig. 2 an end view of the aerosol generating section taken along lines II—II of Fig. 1, and Fig. 3 a transverse section taken along lines III—III of Fig. 1 showing the baffle arrangement.

Referring to the drawings, the apparatus is formed of an elongate chamber 10, preferably constructed of an impervious material and including three separate sections generally designated as an aerosol generating section 12, an exhaust section 14, and an intermediate exposure section 16. Generating section 12 incorporates the fog mist generating means which, as shown, are provided by one or more nozzles 18 of conventional design mounted in an end panel 20, the nozzles being connected by lines 22 and 24 (Fig. 2) to a liquid source and to an atomizing medium, such as compressed air. Pressure gauges 26 and 28 are connected in each of these lines 22 and 24 and the control for varying the weight of fluid per volume of gas may be provided by any suitable valves. The atomizing jets from nozzles 18 are projected longitudinally into the chamber and their forward rush draws atmospheric air in through perforations 30 (Fig. 2) provided in panel 20 about the nozzles. As would be expected, this air combines with the liquid atomized particles to produce a fog flow following the path of the Fig. 1 arrows and this flow is expelled through exhaust section 14.

Exhaust section 14 consists principally of a suction generating means, such as a motor-driven centrifugal fan 32 having an intake side connected to chamber 10 which may be reduced in cross-sectional area at 34 to facilitate the connection. In order to vary the velocity of the aerosol stream the rate of exhaust flow may be varied by regulating the speed of the fan motor 36 by well known control devices, or, alternatively, simply by adjusting a damper 38 in the exhaust end of the fan. As will be later described, the aerosol flow characteristics may be also changed by the use of one or more baffles positioned in the aerosol stream between exposure and generator sections 16 and 12.

The samples to be subjected to the aerosol flow are detachably supported on holders 42 secured within an open-ended exposure cage 44, the cage being arranged to slide in and out of chamber 10 in a frame 46 and any suitable means, such as a pulley 48 can be employed to facilitate this operation. When material coatings are to be tested they first are mounted on test panels 50 and, during exposure, these panels may be observed through a window preferably formed by a transparent side wall of this section. To inspect or replace the test panels, exposure cage 44 may be pulled upwardly to remove the panels from the aerosol stream and, in this upper position shown in broken lines in Fig. 1, it is to be noted that lower cage wall 56 occupies the former position of upper wall 57 to form a closure. In this manner the samples may be removed from the chambers without affecting the aerosol flow.

Improved flow conditions can be achieved by the use of one or more baffles 40 and 41 adjustably positionable in the path of the aerosol, the baffle being provided with openings 40a and 41a by which the flow may be regulated as desired. The size and vertical position of the baffle openings may be changed either by adjusting the baffle position or by providing a plurality of interchangeable baffles adapted to be positioned at different horizontal levels when inserted through slots or gates 58. The unused slots, of course, should be capped by blocks 60 to prevent escape of the aerosol. By use of such baffles the size of the aerosol particles can be regulated by vertical separation in that over-sized particles impinging on the baffles are removed by condensation and flow through a drain 62. Thus, by varying the horizontal and vertical position of the baffles, particle size can be controlled within prescribed limits, and it has been found in practice that with this apparatus the particle size can be controlled between 10–15 microns, although it is obvious that the range can be varied to suit the particular needs of the experiment.

The operation of the apparatus has been generally described with reference to the structure and it now should be apparent that use of the apparatus enables varying types of samples to be exposed to a liquid aerosol under precisely controlled dynamic flow conditions. It therefore is possible to obtain uniformity of experimental factors by varying the particle size, velocity of flow, and weight of the fluid per volume of gas, and by such control improve the quality of any set of experiments. The samples may be readily observed during exposure to the aerosol flow and removed therefrom without affecting the controlled flow.

Obviously, many modifications and variations of the present invention are possible in the light of the above teachings. It is, therefore, to be understood that within the scope of the appended claims the invention may be practiced otherwise than as specifically described.

We claim:

1. Aerosol testing apparatus comprising an elongate chamber, aerosol generating means mounted at one end of the chamber, means mounted in the other end of the chamber for controlling the aerosol flow, a baffle mounted in the path of the aerosol flow, said chamber including a sample exposure section intermediately disposed in the path of the aerosol between the baffle and the aerosol flow controlling means, said exposure section containing means for supporting the sample to be subjected to the aerosol.

2. Aerosol testing apparatus comprising an elongate chamber, aerosol generating means mounted at one end of the chamber, means mounted in the other end of the chamber for controlling the aerosol flow, at least two spaced baffles adjustably mounted in the path of the aerosol flow, said chamber including a sample exposure section disposed in the path of the aerosol between the baffles and aerosol flow controlling means, said exposure section containing means for supporting the sample to be subjected to the aerosol.

3. Aerosol testing apparatus comprising an elongate chamber, an aerosol generating pneumatic nozzle mounted in one end wall of the chamber, one or more air inlet apertures formed in the end wall adjacent the nozzle, an exhaust fan mounted in another end wall of the chamber, means for varying the amount of aerosol exhaust, said chamber including an exposure section having means for supporting a sample in the aerosol flow.

4. Aerosol testing apparatus comprising an elongate chamber, an aerosol generating pneumatic nozzle mounted in one end wall of the chamber, a plurality of inlet openings symmetrically arranged in the end wall adjacent the nozzle, an exhaust fan mounted in another end wall of the chamber and having a damper for varying the aerosol exhaust from the chamber, at least two baffles adjustably mounted in the path of the aerosol flow, said chamber including a transparent sample exposure section having releasable means for supporting a sample in the aerosol path, said exposure section being slidably mounted transversely of the chamber at a position between the baffles and the exhaust fan to permit the sample to be removed from the aerosol without affecting the flow.

5. Aerosol testing apparatus comprising an elongate chamber, aerosol generating means mounted at one end of the chamber, means mounted in the other end of the chamber for controlling the aerosol flow, a baffle mounted in the path of the aerosol flow, said chamber including a removable sample exposure section intermediately disposed in the path of the aerosol between the baffle and the aerosol flowing controlling means, said exposure section containing means for supporting the sample to be subjected to the aerosol and being slidably mounted transversely of the chamber for permitting sample removal without affecting the aerosol.

References Cited in the file of this patent

UNITED STATES PATENTS

| 2,547,367 | Booth | Apr. 3, 1951 |
| 2,640,354 | Bernegger | June 2, 1953 |
| 2,653,473 | Simison | Sept. 29, 1953 |

FOREIGN PATENTS

| 407,173 | Great Britain | Mar. 15, 1934 |